United States Patent [19]

Hahn

[11] 4,098,970
[45] Jul. 4, 1978

[54] TRIMELLITIC ACID MONOESTERS OF STYRENE ALLYL ALCOHOL COPOLYMERS

[75] Inventor: Frank J. Hahn, Wilbraham, Mass.
[73] Assignee: Monsanto Company, St. Louis, Mo.
[21] Appl. No.: 739,679
[22] Filed: Nov. 8, 1976
[51] Int. Cl.$^2$ ............................. C08F 8/14; C08F 8/46
[52] U.S. Cl. ........................................ 526/13; 526/47; 526/56; 560/85
[58] Field of Search ................ 526/56, 13, 47; 560/85

[56] References Cited

U.S. PATENT DOCUMENTS

| | | | |
|---|---|---|---|
| 3,218,282 | 11/1965 | Kay | 526/56 |
| 3,397,254 | 8/1968 | Wynstra et al. | 52/56 |

Primary Examiner—William F. Hamrock
Attorney, Agent, or Firm—R. Bruce Blance; William J. Farrington; James C. Logomasini

[57] ABSTRACT

Carboxylated styrene allyl alcohol copolymers are prepared by reaction of trimellitic anhydride and a hydroxy copolymer under controlled conditions to minimize polyester formation. The hydroxy copolymer is a copolymer of styrene or a substituted styrene and allyl alcohol or methallyl alcohol containing from 1.8 to 10 weight percent hydroxyl. At least one hydroxy group per molecule and preferably 20–80 percent of the hydroxyls of the hydroxy copolymer are reacted with trimellitic anhydride. The carboxylated styrene allyl alcohol copolymers can be used in aqueous or organic solvent solution in adhesive and surface coating applications.

7 Claims, No Drawings

TRIMELLITIC ACID MONOESTERS OF STYRENE ALLYL ALCOHOL COPOLYMERS

BACKGROUND OF THE INVENTION

1. Field of the Invention

This invention relates to alkali soluble styrene allyl alcohol copolymers and more particularly to trimellitic acid monoesters of styrene allyl alcohol copolymers and to the use of these copolymers in aqueous and organic solvent coating compositions as well as to coating compositions containing these copolymers and crosslinking resins such as aminoplasts, epoxies and reactive polymers.

2. Description of the Prior Art

Resinous polyols base upon styrene and allyl alcohol are commercial products which have found use in the surface coating industry both as chemical intermediates for preparation of fatty esters or polyesters and as hard resin components wherein the polyol may or may not be reacted in situ with other components of the coating. Introduction of one or more carboxyl groups into the polyol molecule via half acid ester formation with a suitable organic anhydride renders it soluble in aqueous alkali and could expand the potential use of the copolymers in coatings especially those designed for pollution control.

Such carboxylated polyols prepared by reaction of phthalic anhydride or succinic anhydride with styrene allyl alcohol copolymers have been described in U.S. Pat. No. 3,218,282. However, when these carboxylated polyols are used in aqueous coating formulations they suffer from disadvantages of instability manifested by increased viscosity or gelation and they provide surface coatings which are inadequate to a greater or lesser degree in solvent resistance, hardness and gloss.

A need therefore, exists for a carboxylated styrene allyl alcohol copolymer which is stable in viscosity and free from gelation in aqueous solution.

A further need exists for a carboxylated styrene allyl alcohol copolymer which can be cured to provide coatings which are solvent resistant, hard and glossy.

A further need exists for a carboxylated styrene allyl alcohol copolymer which can be formulated with epoxy resins, aminoplasts and reactive polyester and acrylic resins to give coatings of superior gloss, hardness and solvent resistance.

SUMMARY OF THE INVENTION

These needs are met with a novel group of carboxylated polyols formed by reaction of a hydroxy copolymer with trimellitic anhydride to form a trimellitic acid monoester of the hydroxy copolymer of the general formula

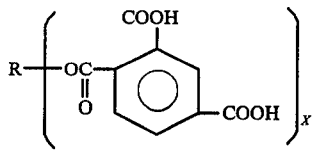

wherein X is at least 1, and R is a copolymeric moiety remaining after reaction of X hydroxyl groups from the hydroxy copolymer with trimellitic anhydride to form X trimellitic acid monoester groups, wherein the hydroxy copolymer is a copolymer of styrene or a substituted styrene and allyl alcohol or methallyl alcohol having a hydroxyl content of from about 1.8 to 10 percent by weight and a styrene or substituted styrene content of from about 50 to 94 percent by weight.

The trimellitic acid monoesters of hydroxy copolymers are readily dissolved in aqueous and organic solvent media and yield surface coatings which can be cured by self condensation to provide solvent resistance, hardness and alkali resistance. The trimellitic acid monoesters can be formulated with epoxy resins, a broad range of aminoplasts and reactive polyesters and acrylic resins to provide coatings with high gloss and hardness.

The carboxylated copolymers of the present invention may be used in basic aqueous solution in floor polishes and waxes which are hard and scuff resistant, in surface coatings for wood, and in aqueous industrial solution or dispersion coatings, sizes, adhesives and impregnants. Apart from aqueous solubility, carboxylation of the hydroxy copolymer introduces capability for crosslinking to provide hardness, chemical resistance and gloss to coating systems. The carboxylated copolymers can also be used in 100 percent solids ink systems and in powder coating systems.

THE PREFERRED EMBODIMENTS

As used herein, the hydroxy copolymers refer to copolymers of an ethylenically unsaturated alcohol and a styrene monomer. Operable copolymers are those containing from about 50 to 94 percent by weight of styrene or a substituted styrene monomer, and preferably 60 to 85 percent by weight and correspondingly, from about 50 to 6 percent by weight of the ethylenically unsaturated alcohol, and preferably from about 40 to 15 percent on the same basis. In general, the styrene allyl alcohol copolymers have from about 1.8 to 10 percent hydroxyl groups by weight, preferably 4 to 9 percent. The styrene allyl alcohol copolymers are of number average molecular weight in the range of 400 to 3000, and more preferably in the range of 800 to 2000 and contain sufficient ethylenically unsaturated alcohol to provide on average at least two hydroxyl groups per molecule and preferably from 2 to 6 hydroxyl groups per molecule. The actual hydroxyl group content of the aforesaid copolymers may not always conform to the theoretical content calculated from the relative proportions of styrene monomer and ethylenically unsaturated alcohol, due to possible destruction of hydroxyl groups during copolymerization.

The styrene monomer moiety of said copolymer may be styrene or a ring-substituted styrene in which the substituents are 1-4 carbon atom alkyl groups or chlorine atoms or mixtures thereof. Examples of such ring-substituted styrenes include the ortho-, meta-, and para-, methyl, ethyl, butyl, etc., monoalkyl styrenes, 2,3-, 2,4-dimethyl and diethyl styrenes; mono-, di- and trichlorostyrenes, etc. Mixtures of two or more of such styrene monomer moieties may be present. The ethylenically unsaturated alcohol moiety may be allyl alcohol, methallyl alcohol, or a mixture thereof. For the purposes of brevity and simplicity of discussion, the entire class of copolymers set forth in this paragraph shall hereinafter be referred to simply as styrene-allyl alcohol copolymers.

The styrene allyl alcohol copolymers may be prepared in several ways. One operable method which yields styrene allyl alcohol copolymer starting materials which are solid products is taught in U.S. Pat.

2,630,430. A more desirable method of copolymerizing the styrene and allyl alcohol components in a substantially oxygen-free composition, thus minimizing the oxidative loss of hydroxyl groups, is disclosed in U.S. Pat. No. 2,894,938.

The molar ratio of trimellitic anhydride reacted with styrene allyl alcohol copolymer is at least 1 so that on average each styrene allyl alcohol copolymer molecule has at least 1 trimellitic acid moiety after the reaction with an anhydride. Sufficient trimellitic anhydride may be reacted with the styrene allyl alcohol copolymer to provide substantially complete esterification of all the hydroxyl groups of the styrene allyl alcohol copolymers. However, it is preferred to react from 20 to 80 percent of the available hydroxyl groups of the styrene allyl alcohol copolymers and even more preferred to react from 40 to 60 percent of the available hydroxyl groups to provide a balance between the ability of the carboxylated copolymer to be cured and the degree of alkali solubility.

In the reaction of trimellitic anhydride with styrene alkali alcohol copolymer a temperature is selected sufficient to allow ring opening of the anhydride to form the trimellitic acid monoester without causing significant polyesterification by interaction of hydroxyl with the carboxyl groups of the trimellitic groups of the trimellitic acid moiety. The reaction can be conducted in bulk or in the presence of an inert solvent to lower the viscosity to allow efficient agitation.

Processing involves brief contact between dehydrated molten or dissolved styrene allyl alcohol copolymer and trimelltic anhydride at a temperature above 80° C. Since the melting point of trimellitic anhydride is 168° C., processing in the absence of solvent requires a temperature approaching or exceeding 168° C. in order to achieve half ester formation rapidly with the anhydride and to minimize polyesterification. The presence of an inert solvent capable of dissolving the trimellitic anhydride enables processing at temperatures well below the melting point of trimellitic anhydride. Hence longer process cycles are permitted without encountering excessive polyesterification. Solvent is also beneficial when reacting styrene allyl alcohol copolymers with high levels of trimellitic anhydride. The course of the reaction is followed by any method which conveniently allows the consumption of the anhydride to be followed. For example, the reaction is considered to be substantially complete when the infrared spectrum of the reaction product indicates the substantial disappearance of the bands characteristic of anhydride at about 1780 cm$^{-1}$ and 1865 cm$^{-1}$.

The trimellitic acid monoesters of styrene allyl alcohol copolymer are soluble in alcohols, esters, ketones, and aqueous alkali. The term alkali includes the hydroxides and carbonates of the alkali metals and ammonia and volatile amines of molecular weight less than 300. In the preparation of surface coatings with alkali resistance from aqueous solutions of the trimellitic acid monoester, ammonia or organic amine is the preferred alkali.

Solutions of the trimellitic acid monoester can be cast on suitable substrates and when they are dried at suitable temperatures, yield products with superior hardness, toughness and gloss. The monoesters have utility in aqueous floor waxes, and as overprint varnishes, can coatings, paper and textile sizes, adhesives and bonding agents.

For enhanced cure at lower temperatures the trimellitic acid monoesters of the present invention can be formulated with epoxy resins of the type prepared by interaction of epichlorohydrin with bisphenols such as bisphenol-A or with the type formed by epoxidation of polyenes. Such epoxy resins are described in Kirk and Othmer, Encyclopedia of Chemical Technology, 2nd Edition, Volume 8, pages 294–312 and more particularly at pages 299–300.

The trimellitic acid monoesters of the present invention can be cured with conventional aminoplast resins such as the methylolated ureas, melamines and benzoguanamines and the etherified derivatives thereof formed by etherification with a $C_1$ to $C_6$ aliphatic or cycloaliphatic alcohol (Kirk and Othmer, Encyclopedia of Chemical Technology, 2nd Edition, Volume 2, pages 225–252). The preferred urea resins contain from 2 to 4 mols of combined formaldehyde and from 0 to 2 mols of combined alcohol and are monomeric or oligomric with a degree of self condensation up to about 90 percent and can contain methylene bridges and uron rings. Preferred melamine resins are those containing an average degree of combination of formaldehyde in the range of 3 to 6 mols per mol of melamine, and an average degree of etherification in the range of 3 to 6 mols alcohol per mol of melamine. The etherified methylolmelamines are monomeric such as hexamethoxymethylmelamine or are self condensed to a degree up to about 90 percent. Similarly, the preferred benzoguanamine resins are those containing an average degree of combination of formaldehyde in the range of 2 to 4 mols per mol of benzoguanamine, an average degree of etherification in the range of 2 to 4 mols per mol of benzoguanamine and a degree of self condensation up to about 90 percent.

The trimellitic acid monoesters can also be formulated with reactive polyesters such as the modified and unmodified polyesters including alkyds and oil free polyesters as discussed in Kirk-Othmer, Encyclopedia of Chemical Technology, 2nd Edition, Volume 1, pages 851–881. Polyfunctional acrylic resins containing hydroxyl and/or carboxyl groups can also be formulated with the trimellitic acid monoesters. Such resins are prepared by copolymerization of hydroxy monomers such as 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate and the like and carboxy monomers such as acrylic acid, methacrylic acid and the like with the acrylic and methacrylic esters of $C_1$ to $C_8$ aliphatic alcohols and may contain up to 50 mol percent and more of an $\alpha,\beta$-ethylenically unsaturated monomer such as styrene, acrylonitrile, methacrylonitrile, ethylene, butadiene, vinyl chloride, vinyl acetate and the like. The polymerization is carried out in the presence of a free radical initiator such as benzoyl peroxide, lauroyl peroxide and the like and a chain transfer agent such as lauryl mercaptan and the like to provide polymers of molecular weight in the range of about 1000 to about 5000 containing at least two functional hydroxyl or carboxyl groups per molecule and hydroxyl or carboxyl monomer content in the range of about 2 to about 40 mol percent.

In most cases, coating compositions comprising the carboxylated styrene allyl alcohol copolymers and an epoxy resin, an aminoplast or a reactive polyester or acrylic resin contain from about 10 to about 90 percent by weight of the carboxylated copolymer and from about 10 to about 90 percent by weight of epoxy resin, aminoplast or reactive polyester or acrylic resin. The preferred compositions contain from about 30 to 70 percent by weight of carboxylated copolymer and from about 30 to 70 percent by weight of epoxy resin, aminoplast resin or reactive polyester or acrylic resin to obtain a balance in rate of cure and level of physical properties of the cured composition.

The trimellitic acid monoesters of styrene allyl alcohol copolymers, and formulations containing the acid monoesters and epoxy resin, aminoplast, reactive polyester or acrylic resin can be cured in the absence of catalyst at temperatures in the range of about 70° to about 250° C. in times ranging from several hours to a few seconds. Cure is preferably achieved in the temperature range of about 90° to about 210° C. in times ranging from about 60 to about 10 minutes to yield hard, glossy films. The cure can be catalyzed with any of the conventional condensation promoting catalysts such as the strong mineral acids, the sulfonic acids, alkali metal and alkaline earth metal hydroxides and carbonates, the alkyl esters of orthotitanic acid, fatty acid salts such as zinc naphthenate, stannous octoate, and organometallic compounds such as dialkyl tin dialkoxides and dialkanoates.

The following examples are set forth in illustration of the present invention and are not to be construed as a limitation thereof. Unless otherwise indicated all parts and percentages are by weight. Examples 1-5 illustrate preparation of monoester in the absence of solvent. Examples 6-7 illustrate preparation in the presence of solvent. Examples 8-11 are for comparative purposes and are not within the scope of the invention.

EXAMPLE 1

PREPARATION OF TRIMELLITIC ACID MONOESTER OF STYRENE ALLYL ALCOHOL COPOLYMER

850 Parts of a styrene allyl alcohol copolymer, having an equivalent weight of about 220 and a number average molecular weight of about 1110 is heated to 200° C. over a period of one hour in a reaction kettle equipped with a high torque anchor agitator, thermometer condenser and trap. The kettle is held at 200° C. for a period of 30 minutes to remove at least 4 parts of water, and is then cooled to 175° C. 142 Parts of trimellitic anhydride (assay 96.7% anhydride) is added with stirring. The temperature drops to 161° C. then is carried to 166° C. within about two minutes by an exotherm, and subsides to about 160° C. within the next two minutes. The batch is discharged from the kettle and is cooled to minimize polyesterification 10 minutes after introduction of trimellitic anhydride. The mol ratio of styrene allyl alcohol copolymer to trimellitic anhydride is 1:1. The acidity of the product is 1.42 meq per gm. compared with a theoretical value of 1.52. Infrared analysis shows that the product is free of anhydride. Succesive batches are designated 1A, 1B etc. Slight differences in values of acidity are found from batch to batch.

EXAMPLES 2 - 5

Examples 2-5 are carried out in the manner described for Example 1 with the same styrene allyl alcohol copolymer. The mol ratio of trimellitic anhydride to styrene allyl alcohol in the successive examples is 2:1, 3:1, 4:1, and 5:1, respectively. In Example 5, the trimellitic anhydride does not dissolve or melt completely, suggesting the need for a processing solvent. The data for the examples are presented in Table 1.

EXAMPLE 6

250 Parts of the styrene allyl alcohol copolymer of Example 1 and 150 parts of methyl isobutyl ketone are charged to a kettle and heated to 121° C. under a nitrogen atmosphere over a period of ½ hour to remove water by azeotrope reflux. After 33 minutes, 202 parts of trimellitic anhydride is charged over a period of 2 minutes. The temperature drops to 110° C. The batch is heated to reach 125° C. in 5 minutes then 130° C. in an additional 5 minutes. The batch is cooled to 110° C. at 55 minutes after the start of the process and then is slowly heated to reach 121° C. at 90 minutes and is held at 121° C. for 15 minutes. It is dumped and cooled rapidly. A sample taken at 90 minutes and subjected to infrared analysis is free of anhydride. The acidity of the product is 4.81 meq per gm. (theor. 4.86).

EXAMPLE 7

Example 7 is prepared by the method of Example 6, to provide a monoester with a ratio of trimellitic anhydride to styrene allyl alcohol copolymer of 1:1, and an acidity of 1.32 meq per gm. (theor. 1.53). The solvent is stripped by vacuum distillation.

EXAMPLE 8

820 Parts of styrene allyl alcohol copolymer of Example 1 and 30 parts of methyl isobutyl ketone are charged to a kettle and heated to 210° C. in 2 hours 15 minutes to remove 5 parts of water. The temperature is reduced to 202° C. 106 Parts of phthalic anhydride is charged in one minute dropping the temperature to 185° C. The batch is heated to 195° C. in 4 minutes and is held at 194° ± 1° C. for 5 minutes. The batch is then discharged from the kettle and cooled to room temperature. The mol ratio of phthalic anhydride to styrene allyl alcohol copolymer is 1:1. The acidity of the product is 0.76 meq per gm. (theor. 0.78). Infrared analysis shows the product to be free of anhydride.

EXAMPLES 9 AND 10

Examples 9 and 10 are prepared by reacting phthalic anhydride with styrene allyl alcohol in the mol ratio of 2:1 and 3:1, respectively, by the method and with the copolymer of Example 8. The data for the examples are presented in Table 1.

EXAMPLE 11

345 Parts of the copolymer of Example 1 and 90 parts of methyl isobutyl ketone are charged to a kettle and heated to 115° C. in 30 minutes to effect complete solution. 30 Parts of succinic anhydride are charged causing the temperature to drop to 105° C. in 10 minutes. Heat is applied to raise the temperature to 125° C. in 10 minutes and the temperature is held at 105° - 125° C. for 35 minutes. Disappearance of anhydride during this period is determined by infrared analysis. Heating is stopped and 60 parts of solvent is removed by vacuum distillation. The mol ratio of succinic anhydride to styrene allyl alcohol copolymer is 1:1. The acidity of the product is 0.76 meq per gm. (theor. 0.81).

TABLE I

CHARACTERIZATION OF EXAMPLES 1 - 11

| Example | Anhydride | Process Solvent (MIBK) | Anhydride Assay | Theor. Acidity meq/gm | Actual Acidity meq/gm | Calculated Ester Equivalent meq/gm | Solids |
|---|---|---|---|---|---|---|---|
| 1 | Trimellitic | None | 96.7 | 1.5210 | 1.4243 | 0.8202 | 99.5 |
| 2 | " | None | 96.7 | 2.6622 | 2.4563 | 1.4722 | 99.6 |
| 3 | " | None | 96.7 | 3.5504 | 3.4258 | 1.8134 | 99.6 |
| 4 | " | None | 96.7 | 4.2487 | 4.1642 | 2.1054 | 99.7 |
| 5 | " | None | 96.7 | 4.8314 | 4.9371 | Incomplete | 99.5 |
| 6 | " | 25% | 96.7 | 4.8604 | 4.8128 | 2.3591 | 80.05 |
| 7 | " | 15.60% | 96.7 | 1.5263 | 1.3195 | 0.9328 | 94.34 |
| 8 | Phthalic | 2.50% | 99 | 0.7823 | 0.7554 | 0.7937 | 97.9 |
| 9 | " | 1.40% | 99 | 1.4051 | 1.3537 | 1.4286 | 98.9 |
| 10 | " | 1.26% | 99 | 1.9109 | 1.8828 | 1.9012 | 99.1 |
| 11 | Succinic | 16% | 99 | 0.8079 | 0.7609 | 0.8389 | 94.0 |

EVALUATION OF SURFACE COATINGS

The carboxylated styrene allyl alcohol compositions are prepared in solution in appropriate solvents and applied to a suitable substrate. The coatings are cured at a temperature selected in the range of 70° to 205° C. for a period of 10 to 60 minutes. The thickness of the cured film may be varied in the range of 12.5 to 500 microns. For test purposes, films of 22 microns are used, coated on steel panels supplied by the Parker Rust-Proof Co., Morenci, Mich., under the trade name Bonderite 1000. The baked cured panels are aged overnight at 25° ± 1° C. and 50 percent relative humidity. The coatings are evaluated for appearance including gloss and surface roughness. They are tested by the following procedures:

Pencil Hardness per ASTM D 3363-74

Conical Bend or Flex (Elongation per ASTM D 522-60). The tests are carried out on DT 36 panels supplied by Q Panel Company, Cleveland, Ohio Flex 3.2 mm. Mandrel ASTM D 1737-62

Impact Resistance ASTM D 2794-69. The tests are carried out with films of 20.5 ± 1.3 microns cast on Metabond 36 steel panels supplied by R. O. Hull & Co., Inc.

0.1N NaOH Spot Test — 1 hr. (covered) — ASTM D 1308

Xylol Spot 30' (covered) — ASTM D 1308-57

MEK Rub (double) strokes — Double strokes required to erode film and cause break through to the metal. A felt tip (1 cm. diam.) pen saturated with methyl ethyl ketone is oscillated on the coating surface using a uniform moderate pressure.

A comparison (Table II) of solutions of the trimellitic, phthalic and succinic acid monoesters in aqueous alkali shows that the trimellitic acid monoester is far superior in viscosity, stability and freedom from gelation.

TABLE II

COMPARISON OF AQUEOUS ALKALINE SOLUTIONS OF ACID MONVESTERS OF STYRENE ALLYL ALCOHOL COPOLYMER

| Half Ester | Ex. 1A | Ex. 8A | Ex. 11A | Ex. 1A | Ex. 8A | Ex. 11A |
|---|---|---|---|---|---|---|
| Mol Ratio Anhydride:SAA Copolymer | 1:1 | 1:1 | 1:1 | 1:1 | 1:1 | 1:1 |
| Anhydride | TMA | Phthalic | Succinic | TMA | Phthalic | Succinic |
| Sapon. Equiv. meq/gm | 2.3761 | 1.6938 | 1.7285 | 2.3761 | 1.6938 | 1.7285 |
| meq acid/gm | 1.4350 | 0.8278 | 0.8095 | 1.4350 | 0.8278 | 0.8095 |
| meq acid (H$_2$) Ext.)/gm | 0.1475 | 0.1016 | 1.1481 | 0.1475 | 0.1016 | 1.1481 |
| Aqueous Solutions (pbw) | | | | | | |
| Resin Solids | 25 | 25 | 25 | 25 | 25 | 25 |
| Residual Solvent | 2.30 | 2.00 | 1.60 | 2.30 | 2.0 | 1.60 |
| Triethylamine | — | — | — | 3.65 | — | 2.05 |
| DMEA | 3.21 | — | 1.80 | — | 3.0 | — |
| Morpholine | — | 2.20 | — | — | — | — |
| Water | 69.49 | 95.80 | 71.60 | 69.05 | 80.10 | 71.35 |
| Solids % | 25 | 20 | 25 | 25 | 22.7 | 25 |
| pH | 7.15 | 8.65 | 8.20 | 7.65 | 9.75 | 8.10 |
| Initial Clarity | Clear | Cloudy | Sl. Haze | Haze | Opaque | Haze |
| meq acid/gm solution | 0.3716 | 0.1647 | 0.2075 | 0.3765 | 0.1936 | 0.2076 |
| % Neutralization | 107 | 128 | 95 | 98 | 162 | 94 |
| Solution Stability (50° C.) | | | | | | |
| Initial Acidity | 0.3716 | 0.1647 | 0.2075 | 0.3765 | 0.1936 | 0.2076 |
| 14 days (meq/gm | 0.3835 | 0.1712 | 0.2278 | — | — | — |
| 60 Days solution) | 0.4066 | 0.2036 | 0.2312 | — | — | — |
| Increase in acidity | 0.0350 | 0.0389 | 0.0237 | — | — | — |
| Initial | A4+ | A3–A4 | A2–A3 | A3– | C-D | A3 |
| 7 Days Gardner-Holt | A4– | T-U | D-E | A2 | Gel | T-U |
| 14 Days Viscosity | A4– | Z5 | Z2 | A2 | — | Z3 |
| 21 Days | A4– | Gel | Z6 | A2 | — | Gel |
| 30 Days | A4– | — | Gel | A2 | — | — |
| 60 Days | A3 | Sep'n | — | Gel | (Sep'n) | — |

Comparison (Table III) of the film properties of the same three monoesters versus an uncarboxylated styrene allyl alcohol copolymer, cast from MIBK and each baked 30 minutes at 150° C. indicates that carboxylation reduces alkali resistance as demonstrated by the aqeuous sodium hydroxide spot test. When catalyzed with 5 parts toluenesulfonic acid per 100 parts resin only the succinic acid monoester shows some small improvement in solvent resistance over the uncarboxylated polymer at 150° C. When baked 30 minutes at 205° C., however, with or without PTSA catalyst, both the trimellitic acid monoester and succinic acid monoester surpass the uncarboxylated copolymer in solvent resistance and hardness without sacrifice in alkali resistance thereby indicating that self condensation has occurred. The phthalic acid monoester by contrast exhibits poor solvent and alkali resistance and the uncarboxylated control exhibits poor solvent resistance. Catalysis is particularly damaging to the solution stability of the succinic acid monoester which gelled after 6 days at room temperature.

When baked 30 minutes at 121° C. in the absence of catalyst, the trimellitic monoester exhibits higher hardness, flexibility and solvent resistance without sacrifice in alkali resistance. Catalyst provides improved solvent resistance only at the lower bake temperature and at a sacrifice in pot life.

TABLE IV

COMPARISON OF TRIMELLITIC AND SUCCINIC ACID MONOESTERS OF SAA COPOLYMER AND SAA COPOLYMER, FORMULATED WITH UREA RESIN

|  | Non-Catalyzed | | | Catalyzed | | |
|---|---|---|---|---|---|---|
| Half Acid Monoester | Trimellitic Ex. 1A | Succinic Ex. 11A | SAA Copolymer | Trimellitic Ex. 1A | Succinic Ex. 11A | SAA Copolymer |
| % PTSA based on Urea | 0 | 0 | 0 | 1 | 1 | 1 |
| 0.85 mils-70° C./30 Min. | | | | | | |
| Pencil Hardness | HB | <6B | — | HB | HB | — |
| MEK Rub | 10 | 5 | — | 250 | 110 | — |
| 0.85 mils-70° C./30 Min. | | | | | | |
| Pencil Hardness | HB | Tacky 3B-4B | HB | HB | HB | — |
| MEK Rub | 15 | 10 | — | 250 | 100 | — |
| 0.85 mils-70° C./30 Min. | | | | | | |
| Pencil Hardness | H-2H | HB | HB | F | HB | F |
| MEK Rub | 97 | 17 | 10 | >400 | >400 | 200 |
| 0.85 mils-121° C./30 Min. | | | | | | |
| Pencil Hardness | 3H | 2H-3H | H | 3H | 3H | 3H |
| MEK Rub | >300 | 200 | 27 | >300 | >300 | >300 |
| Conical bend 10.2 cm panel - Centimeters Fail | 0 | 0 | 7.62 | 3.81 | 5.08 | 7.62 |
| Type Fail | — | — | * | D | D | D |
| NaOH Spot . 1N 1 hr. | Pass | Pass | Pass | Pass | Pass | Pass |
| Solution gel time hr. | — | — | — | <4 | <4 | <4 |
| Stability 3 months | Pass | Pass | Pass | — | — | — |

*severe cracking
D-delamination

The trimellitic and succinic acid monoesters are further compared (Table IV) with uncarboxylated copolymer in formulations containing 60 parts by weight of the acid monoester and 40 parts by weight of a butoxymethylurea containing a combined formaldehyde to urea mol ratio of 2.56:1 and a degree of etherification with butanol of 1.15 with and without PTSA (1 weight percent of the urea resin). The comparison is made at bake temperatures from 70° to 121° C.

The mono, di, tri, tetra and penta trimellitic acid monoesters and the mono, di and tri phthalic acid monoesters of styrene allyl alcohol copolymer are compared as films cast from butyl acetate solution. The data are presented in Table V. The results indicate that self condensation which takes place somewhere between 150° and 205° C. imparts considerable solvent, flex, and alkali resistance to the trimellitic acid monoesters and suggests a performance peak at 2-3 mols trimellitic acid per mol of styrene allyl alcohol copolymer. By comparison the phthalic acid monoesters are only negligibly responsive toward self-condensation at 205° C., exhibiting poor solvent and flex resistance.

TABLE III

COMPARISON OF TRIMELLITIC, SUCCINIC AND PHTHALIC ACID MONOESTERS OF STYRENE ALLYL ALCOHOL COPOLYMER (1:1 Mol Ratio)

|  | Non-Catalyzed | | | | Catalyzed (PTSA) | | | |
|---|---|---|---|---|---|---|---|---|
| Acid Monoester | Ex. 1A Trimellitic | Ex. 11A Succinic | Ex. 8A Phthalate | SAA Copolymer | Ex. 1A Trimellitic | Ex. 11A Succinic | Ex. 8 Phthalic | SAA Copolymer |
| 30 minute bake, 150° C. | | | | | | | | |
| Pencil Hardness | HB | HB | HB | HB | HB | HB | HB | HB |
| MEK Rubs (double) | 10 | 10 | 10 | 10 | 10 | 40 | 10 | 10 |
| Conical bend 10.2 cm panel - Centimeters Fail | 10.2* | 10.2* | 10.2D | 10.2D* | 10.2D | 10.2D | 10.2D | 10.2D* |
| 0.1N - NaOH Spot 1 hr. | Severe Scaling | Severe Blush | Severe Blush | Pass | Severe Scaling | Severe Blush | Severe Blush | Pass |
| 30 minute base, 205° C. | | | | | | | | |
| Pencil Hardness | 3H | 3H | F | HB | F | F | HB | HB |
| MEK Rubs (double) | 200+ | 200+ | 10 | 10 | 200+ | 200+ | 20 | 10 |
| Conical bend 10.2 cm panel - Centimeters Fail | 10.2C | 10.2D | 10.2D* | 10.2D* | 10.2D | 10.2D | 10.2D* | 10.2D* |
| 0.1N - NaOH Spot 1 hr. | Pass | Pass | Severe Blush | Pass | Pass | Pass | Severe Blush | Pass |

C-very fine cracking
*-severe cracking
D-delamination

TABLE V
COMPARISON OF TRIMELLITIC AND PHTHALIC ACID MONOESTERS

| Half Ester | Trimellitic | | | | | Phthalic | | |
|---|---|---|---|---|---|---|---|---|
| | Ex. 1B | Ex. 2B | Ex. 3B | Ex. 4B | Ex. 6B | Ex. 8B | Ex. 9B | Ex. 10B |
| Mol Ratio - Anhydride:SAA Copolymer | 1:1 | 2:1 | 3:1 | 4:1 | 5:1 | 1:1 | 2:1 | 3:1 |
| Acidity meq/gm | 1.46 | 2.52 | 3.45 | 4.21 | 4.92 | 0.75 | 1.35 | 1.88 |
| Viscosity in Butyl Acetate, Gardner Holt | | | | | | | | |
| 50% Solids | V | Z1 | Gel | Gel | Gel | G | I+ | G-H |
| 45% Solids | — | — | N | Gel | Gel | — | — | — |
| 40% Solids | — | — | — | E | Gel | — | — | — |
| 35% Solids | — | — | — | — | B+ | — | — | — |
| 30 Minutes at 150° C. | | | | | | | | |
| Pencil Hardness | HB | HB | HB-F | F-H | F-H | HB | HB | HB |
| MEK Rubs (double) | 10 | 25 | 20 | 25 | 15 | <10 | <10 | <10 |
| 0.1N NaOH Spot 60 Minutes | Blush | Blush | Fail | Fail | Fail | Pass | Pass | Blush |
| Conical Bend, Fail, cm., 12.7 cm. panel | 12.7* | 12.7* | 12.7* | 12.7* | 12.7* | 12.7* | 12.7* | 12.7* |
| 30 Minutes at 205° C. | | | | | | | | |
| Pencil Hardness | 2H | 2H | 2H | 2H | 2H | F | F-HB | F-HB |
| MEK Rubs (double) | 100 | >200M | >200M | >200M | >200M | <10 | <10 | <10 |
| 0.1N NaOH Spot 60 Minutes | Pass | Pass | Pass | Pass | Pass | Pass | Pass | Pass |
| Conical Bend, Fail, cm. | 5.08CD | Pass | Pass | 0.16 | Pass | 12.7* | 12.7* | 12.7* |

*Severe Cracking
C-Cracks
D-Delaminates

These same series of trimellitic and phthalic acid monoesters are compared in solvent based coatings containing equivalent amounts of the acid monoester and an epoxy resin sold by Shell Chemical Company under the trade name Epon 828. The coatings are cast from 50 percent solutions of the resins in a mixed solvent containing 50 percent butyl acetate and 50 percent butanol. The results presented in Table VI show that at temperatures of 150° and 177° C., regardless of the degree of acidity, the phthalic acid monoesters exhibit poor cure response to the epoxy resin. The trimellitic acid monoesters by contrast exhibit high cure response yielding films of high hardness, solvent resistance, alkali resistance and flexibility. Of particular interest is the high impact strength and film flexibility.

TABLE VI
COMPARISON OF TRIMELLITIC AND PHTHALIC ACID MONOESTERS WITH 1 EQUIVALENT OF EPON 828 EPOXY RESIN

| Half Ester | Trimellitic | | | | | Phthalic | | |
|---|---|---|---|---|---|---|---|---|
| | Ex. 1B | Ex. 2B | Ex. 3B | Ex. 4B | Ex. 6B | Ex. 8B | Ex. 9B | Ex. 10B |
| Mol Ratio - Anhydride:SAA Copolymer | 1:1 | 2:1 | 3:1 | 4:1 | 5:1 | 1:1 | 2:1 | 3:1 |
| Acidity meq/gm | 1.46 | 2.52 | 3.45 | 4.21 | 4.92 | 0.75 | 1.35 | 1.88 |
| 30 Minutes at 150° C. | | | | | | | | |
| Pencil Hardness | 2H | 2H | 2H | 2H | 2H | HB | F | 2H |
| MEK Rubs (double) | 35 | >200M | >200M | >200M | >200M | <10 | 10 | 20 |
| NaOH (0.1N) 60 minute Spot | Pass | Pass | Pass | Pass | Pass | Pass | Pass | Pass |
| Conical Bend, Fail, 12.7 cm. panel | 12.7 | Pass | Pass | Pass | Pass | 12.7 | 12.7 | 12.7 |
| Impact Forward, cm. kg. | 12 | 29 | 35 | 46 | 58 | <2 | <2 | <2 |
| Impact Reverse, cm. kg. | <2 | <6 | 6 | <6 | 17 | 0 | 0 | 0 |
| 30 Minutes at 177° C. | | | | | | | | |
| Pencil Hardness | 3H | 3H | 3H | 3H | 3H | H | 2H | 3H |
| MEK Rubs (double) | 175 | >200 | >200 | >200 | >200 | 10 | 15 | 35 |
| NaOH (0.1N) 60 minute Spot | Pass | Pass | Pass | Pass | Pass | Blush | Pass | Pass |
| Conical Bend | Pass | Pass | Pass | Pass | Pass | 12.7* | 12.7* | 12.7* |
| Impact Forward, cm. kg. | 23 | 40 | 63 | 52 | 63 | <2 | 6 | 12 |
| Impact Reverse, cm. kg. | <6 | 12 | 29 | 17 | 29 | 0 | 0 | 0 |

*Severe Cracks

What is claimed is:

1. A trimellitic acid monoester of a hydroxy copolymer of the general formula

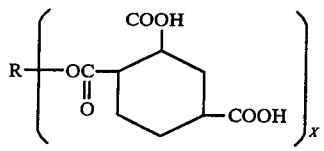

Wherein X is at least 1, and R is a copolymeric moiety remaining after reaction of X hydroxyl groups from the hydroxy copolymer with trimellitic anhydride to form X trimellitic acid monoester groups; wherein the hydroxy copolymer is a copolymer of styrene or a substituted styrene and allyl alcohol or methallyl alcohol having a hydroxyl content of from about 1.8 to 10 percent by weight and a styrene or substituted styrene content of from about 50 to 94 percent by weight; wherein from 20 to 80 percent of the hydroxyl groups of the hydroxy copolymer have been reacted with trimellitic anhydride and wherein the number average molecular weight of the hydroxy copolymer is in the range of 400 to 3000.

2. The trimellitic acid monoester of claim 1 the styrene or substituted styrene content of the hydroxy copolymer is in the range of 60 to 95 percent by weight.

3. The trimellitic acid monoester of claim 2 wherein from 40 to 60 percent of the hydroxyl groups of the hydroxy copolymer have been reacted with trimellitic anhydride.

4. The trimellitic acid monoester of claim 3 wherein the hydroxy copolymer is a styrene allyl alcohol copolymer.

5. The alkali salt of the trimellitic acid monoester of claim 2.

6. An article of manufacture comprising a substrate coated with the composition of claim 1.

7. An article of manufacture comprising a substrate coated with the composition of claim 4.

* * * * *